(12) United States Patent
Bahr et al.

(10) Patent No.: US 8,908,670 B2
(45) Date of Patent: Dec. 9, 2014

(54) METHOD FOR GENERATING EXTENDED ROUTE MESSAGE, METHOD FOR GENERATING AN EXTENDED ROUTE REPLY MESSAGE, EXTENDED ROUTE REQUEST MESSAGE, EXTENDED ROUTE REPLY MESSAGE AND FIRST AND SECOND NODES

(75) Inventors: Michael Bahr, München (DE); Norbert Vicari, München (DE)

(73) Assignee: Siemens Aktiengesellschaft, Munich (DE)

( * ) Notice: Subject to any disclaimer, the term of this patent is extended or adjusted under 35 U.S.C. 154(b) by 1311 days.

(21) Appl. No.: 12/309,317

(22) PCT Filed: Jul. 12, 2007

(86) PCT No.: PCT/EP2007/057192
§ 371 (c)(1),
(2), (4) Date: Jan. 14, 2009

(87) PCT Pub. No.: WO2008/006882
PCT Pub. Date: Jan. 17, 2008

(65) Prior Publication Data
US 2009/0316668 A1 Dec. 24, 2009

(30) Foreign Application Priority Data

Jul. 14, 2006 (EP) .................................... 06014744

(51) Int. Cl.
*H04J 3/24* (2006.01)
*H04L 12/28* (2006.01)
(Continued)

(52) U.S. Cl.
CPC .............. *H04W 40/246* (2013.01); *H04W 8/26* (2013.01); *H04W 40/28* (2013.01); *H04W 40/20* (2013.01)
USPC ............ 370/349; 370/392; 370/401; 370/406

(58) Field of Classification Search
None
See application file for complete search history.

(56) References Cited

U.S. PATENT DOCUMENTS

| 2002/0101875 A1* | 8/2002 | Lui et al. ....................... 370/402 |
| 2005/0195814 A1* | 9/2005 | Hagiwara et al. ............. 370/389 |

(Continued)

FOREIGN PATENT DOCUMENTS

| JP | 2005-79025 | 3/2005 |
| JP | 2005-236767 | 9/2005 |

(Continued)

OTHER PUBLICATIONS

"Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking"; IEEE P802.11s™/D0.02; 802.11 Working Group of the LAN/MAN Committee; Jun. 2006; pp. i-xvi, 1-202.

(Continued)

*Primary Examiner* — Christine Duong
(74) *Attorney, Agent, or Firm* — Staas & Halsey LLP

(57) ABSTRACT

Route discovery of a route from a source node of an IEEE 802 connection to a destination node of an IEEE 802 connection, including a mesh network path with a source node of the mesh path and a destination node of the mesh path, is initiated by an extended route request message generated by the destination node. The extended route request message includes a flag that indicates whether the source node of the IEEE 802 connection is located inside or outside the mesh network, and either one source address of the source node, if the node is inside the mesh network, or two source addresses covering (a) the source address of the source node of the mesh path and (b) the source address of the source node of the IEEE 802 connection, if the node is outside the mesh network.

18 Claims, 7 Drawing Sheets

(51) Int. Cl.
*H04W 40/24* (2009.01)
*H04W 8/26* (2009.01)
*H04W 40/28* (2009.01)
*H04W 40/20* (2009.01)

(56) References Cited

U.S. PATENT DOCUMENTS

| | | | |
|---|---|---|---|
| 2006/0098611 A1* | 5/2006 | Joshi et al. | 370/338 |
| 2007/0091871 A1* | 4/2007 | Taha | 370/352 |
| 2007/0165592 A1* | 7/2007 | Gossain et al. | 370/349 |
| 2007/0248089 A1* | 10/2007 | Redi et al. | 370/392 |
| 2007/0266143 A1* | 11/2007 | Zeng et al. | 709/224 |
| 2009/0135824 A1* | 5/2009 | Liu | 370/392 |

FOREIGN PATENT DOCUMENTS

| | | |
|---|---|---|
| JP | 2006-166232 | 6/2006 |
| WO | 2006/031445 A2 | 3/2006 |
| WO | 2007/016417 A2 | 2/2007 |

OTHER PUBLICATIONS

C. Perkins et al., "Ad hoc On-Demand Distance Vector (AODV) Routing", Network Working Group, RFC 3561, Jul. 2003; pp. 1-37.
Extension to 6-Address Scheme for TGs Mesh; IEEE 802.11-06/0841r1; Jun. 2006; slides 1, 2, 4-20.
"Draft Standard for Information Technology—Telecommunications and information exchange Between Systems—Local and metropolitan area networks—Specific requirements—Part 11: Wireless Medium Access Control (MAC) and physical layer (PHY) specifications Amendment <number. ESS Mesh Networking"; IEEE 802.11s TM/D1.03; Apr. 2007; pp. i, iii-xiii, 2-8.
Bahr Michael, "Proposed Routing for IEEE 802.11s WLAN Mesh Networks", Proceedings of the 2nd Annual International Workshop on Wireless Internet, Aug. 2006, 10 pp.
K. Kim; "IEEE P802.11 Wireless LANs, Proposed Texts for TGs Comment Resolution"; IEEE 802.11-06/XXXXr0—Aug. 2006; pp. 1-12.
Bahr M. et al., "Joint SEE-Mesh/Wi-Mesh Proposal to 802.11 TGs", IEEE 802.11-06/0328r0, Feb. 2006, pp. 1-165.
Gossain H. et al., "Packet forwarding for on-routable devices in Multi-hop Wireless Mesh", IEEE 802.11-06/0661r0, May 2006, pp. 1-17.
M. Bahr et al., "RFI CID Resolutions", IEEE 802.11-07/2258r0, Jul. 2007, pp. 1-7.
International Search Report for corresponding international application PCT/EP2007/057192, mailed Sep. 18, 2007.
English translation of Japanese Office Action issued Apr. 28, 2011 in corresponding Japanese Patent Application 2009-519947.
Scheu M. et al., "802.11 TGs MAC Enhancement Proposal", IEEE 802.11-05/0575R4, Nov. 2005, pp. 1, 64-67.
European Office Action dated Dec. 20, 2010 and issued in corresponding European Patent Application 07 787 463.4.

* cited by examiner

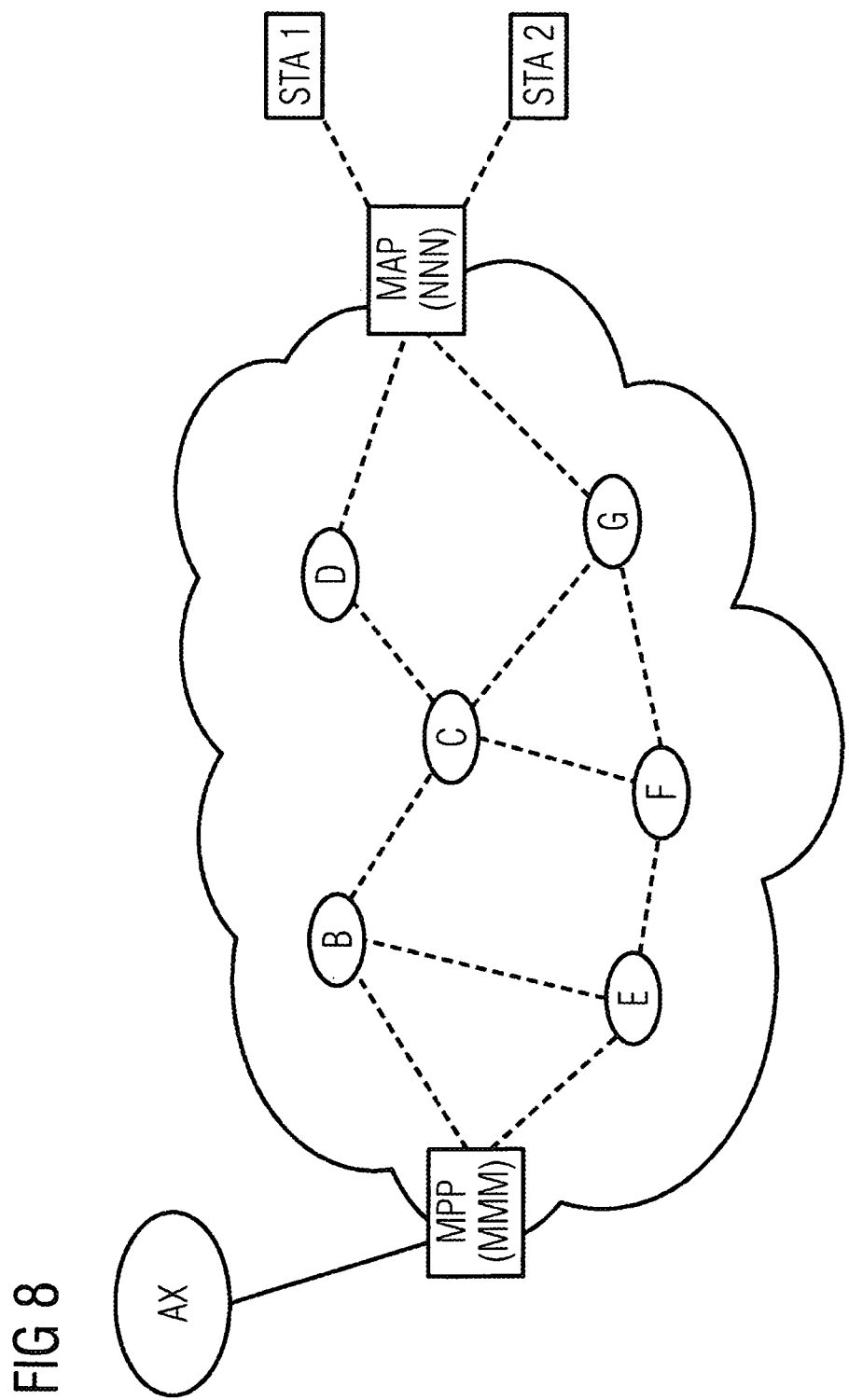

METHOD FOR GENERATING EXTENDED ROUTE MESSAGE, METHOD FOR GENERATING AN EXTENDED ROUTE REPLY MESSAGE, EXTENDED ROUTE REQUEST MESSAGE, EXTENDED ROUTE REPLY MESSAGE AND FIRST AND SECOND NODES

CROSS REFERENCE TO RELATED APPLICATIONS

This application is based on and hereby claims priority to European Application No. 06014744.4 filed on Jul. 14, 2006, the contents of which are hereby incorporated by reference.

BACKGROUND

Described below is a method for generating an extended route request message and a method for generating an extended route reply message for a route discovery for a route from a source node of an IEEE 802 connection to a destination node of an IEEE 802 connection including a mesh network path with a source node of the mesh path and a destination node of the mesh path. Also described below is an extended route request message and an extended route reply message. Finally, first and second nodes in the mesh network are described.

The task group IEEE 802.11s (IEEE—Institute of Electrical & Electronics Engineers) defines a standard for WLAN mesh networking (WLAN—Wireless Local Area Network) on OSI layer 2 (OSI—Open Systems Interconnection) right now. A possible network structure for networks with IEEE 802.11s meshes is shown in FIG. 1. All nodes can be within 1 IP hop (IP—Internet Protocol), that is, frames can be sent from any node in any part of the network to any other node in any part of the network solely based on the MAC (MAC—Media Access Control) address of the destination. In contrast to IP, where the IP address also describes the network structure, the MAC address is a real interface ID (ID—identification) without any additional information about network structure. More specifically, the MAC addresses do not give any clue whether the interface with that MAC address is located in the LAN (LAN—Local Area Network), WLAN Mesh or in the "WLAN cell".

The WLAN mesh network deploys a special routing protocol or path selection protocol inside its part of the overall net-work structure. That means that there has to be a mesh source node and a mesh destination node. With respect to the network architecture depicted in FIG. 1, three nested "connections" can be seen in connection with a WLAN mesh network:

wireless link: the actual wireless link, defined by the transmitter of the radio signal and the receiver of this radio signal mesh path: the path through the WLAN mesh network from the mesh source node/mesh ingress to the mesh destination node/mesh egress. Mesh source node and mesh destination node are the nodes where a frame enters or leaves the WLAN mesh respectively. The mesh path has one or more wireless links.

802 connection/layer 2 connection: This connection is described by a source MAC address and a destination MAC address from any part of the above network (FIG. 1). Usually, the source MAC address is the MAC address of the interface where the IP packet enters layer 2 and the destination MAC address is the MAC address of the inter-face where the layer 2 frames are handed back to the IP layer. An 802 connection/layer 2 connection may include one or more mesh paths. Or the 802 connection/layer 2 connection might be the same as the mesh path.

FIG. 1 illustrates this as an example, whereby shortened MAC addresses are used. FIG. 1 shows a wired LAN NET1, a WLAN mesh network NET2 and WLAN-"cell" NET3. The mesh nodes are oval and use the references A-H. A data frame has to be sent from node X1 with MAC address 27:45 in the LAN part to the non-mesh station STA with MAC address e3:33 through the WLAN mesh. This is the 802 connection/layer 2 connection. The mesh path on which the packet traverses the WLAN mesh has the mesh node V with MAC address 21:e5 as mesh source and the mesh node E with MAC address 37:fa as mesh destination. If the mesh node G with MAC address 12:fa has to forward the data frame, the wireless link will be described by the transmitter G with MAC address 12:fa and the receiver D with MAC address 72:54.

Since all 6 MAC addresses can be different as in the paragraph above, a mesh data frame has to support 6 MAC addresses in some cases. The current mesh frame format as defined in Draft amendment to standard IEEE 802.11 ™, ESS Mesh Networking, IEEE P802.11s™/D0.02, June 2006, <grouper.ieee.org/groups/802/11>, has 4 MAC addresses: 2 for the wireless link and 2 for the mesh path or source and destination. A scheme for the use of 6 MAC addresses is known from Chu et. al., "Extension to 6-Address Scheme for TGs Mesh", 26 Jun. 2006, document number IEEE 802.11-06/841r1, whereby there are MAC addresses 1 and 2 for the wireless link, MAC addresses 3 and 4 for the mesh path, and MAC addresses 5 and 6 for the 802 connection. MAC addresses 5 and 6 can be omitted if mesh path and 802 connection coincide. Additional reference signs of FIG. 1 represent the following functions:

"11" (non-IEEE 802.11) wired LAN, e.g. Ethernet with spanning tree algorithm;

"12" WLAN mesh ad hoc routing;

"13" WLAN "cell" with communication between MAP and STA (standard wireless IEEE 802.11 communication);

"14" A DHCP-server (DHCP—Dynamic Host Configuration Protocol) may be located in NET1;

"15" An IP-router (IP-Internet Protocol) may be located in NET1 for routing IP-based packets to other IP-based networks;

"16" IP subnet.

The current draft of the IEEE 802.11s is not very specific on establishing the mapping between mesh path and 802 connection in HWMP. Moreover, it seems that this problem has not been considered extensively. The general idea seems to be, that the mesh ingress/mesh egress generates and manages routing messages on behalf of the non-mesh nodes. This means, that the non-mesh nodes virtually become mesh nodes, but that the processing of the routing messages is done by real mesh nodes on behalf of the non-mesh nodes. The MAC addresses of the non-mesh nodes will be known inside the mesh and are rout-able. This concept is described for the connection of WLAN stations (STAs in FIG. 1) in section 11A.4.3.1.4.2 (page 78) of the June 2006 Draft amendment to standard IEEE 802.11™. It can be easily extended to mesh portals that are connected to wired LANs.

Gossain et. al., "Packet forwarding for non-routable devices in Multi-hop Wireless Mesh", 15 May 2006, document number IEEE 802.11-06/0661r0 proposes a route request (RREQ) and route reply (RREP) message scheme for supporting mesh nodes, e.g. station G in FIG. 1, and non-mesh stations or non-routable devices, called STA (STA=stations) on page 6 in the June 2006 Draft amendment to standard IEEE 802.11™. These stations are managed by particular mesh nodes that support an access point (AP). In Gossain et. al., "Packet forwarding for non-routable devices in Multi-hop Wireless Mesh", 15 May 2006, document number IEEE 802.11-06/0661r0, the MAC-address of an originating device is included to the RREQ-message, whereby this MAC-address shall be either the address of an routable device, such as a mesh node, in case the traffic was generated by itself or an address of a non-routable device in the case the traffic was generated by a non-routable device, which is an STA, currently proxied by itself. An MAC-address of a terminating device is added to the RREP-message, whereby this MAC-address shall be either the address of a routable device in case the traffic was destined to itself or an address of non-routable device, such as a STA, in case the traffic was destined for a non-routable device currently proxied by itself.

However none of the current proposals completely supports a set of mechanisms for establishing the mapping between the mesh path and the 802 connection in the mesh ingress and mesh egress nodes. Especially, there is no mechanism defined for the reactive route discovery as used in AODV (see Chu et. al., "Extension to 6-Address Scheme for TGs Mesh", 26 Jun. 2006, document number IEEE 802.11-06/841r1) and HWMP. The latter is the default routing protocol of IEEE 802.11s (see the June 2006 Draft amendment to standard IEEE 802.11™).

SUMMARY

Hence, aspects include a method and a device supporting both routable devices, such as mesh nodes, and all kind of non-routable devices, such as stations STA and non IEEE 802.11 devices for reactive route discovery and to minimize a required signaling overhead.

Described below is a method for generating an extended route request message for a route discovery for a route from a source node of an IEEE 802 connection to a destination node of an IEEE 802 connection including a mesh network path with a source node of the mesh path and a destination node of the mesh path, by
  Determining whether the source node of the IEEE 802 connection is inside or outside the mesh network;
  Generating an extended route request message that includes one source address of the source node of the mesh path and a flag, which indicates that the extended route request message covers the one source address, if the source node of the IEEE 802 connection is a node inside the mesh network.
  Generating an extended route request message that includes two source addresses covering (a) the source address of the source node of the mesh path and (b) the source address of the source node of the IEEE 802 connection and the flag, which indicates that the extended route request message covers the two source addresses, if the source node of the IEEE 802 connection is a node outside the mesh network.

This method generates the extended route request message depending on the location of the source node of the IEEE 802 connection. Hence, a transmission bandwidth=signaling overhead to transmit the extended route request message is optimized depending on the location of the source node of the IEEE 802 connection, because it covers only one source address if the source node of the IEEE 802 connection originates from a node inside the mesh network, otherwise two source addresses. In addition, the usage of the flag allows a faster transmission of the route request message if a fixed bandwidth link is used for transmission, because it indicates whether only one or two source addresses are transmitted, compared to the case that always two source addresses have to be transmitted.

In an extension to the forgoing method the source node of the mesh path is assigned to a mesh node that reflects an ingress node, mesh access point or mesh portal of the mesh network to address the source node of the IEEE 802 connection, if the source node of the IEEE 802 connection originates from a node outside the mesh network.

This assignment supports a correct mapping of a source address inside the mesh network if the source node of the IEEE 802 connection originates from a node outside the mesh network. In addition this assignment allows that a route reply message finds its correct way to the source node of the mesh path in the mesh network. Furthering this enhancement ensures a smooth handling of route request and route reply messages regardless whether the node is inside or outside the mesh network.

Also described below is a method for generating an extended route reply message for a route discovery a route from a source node of an IEEE 802 connection to a destination node of an IEEE 802 connection including a mesh network path with a source node of the mesh path and a destination node of the mesh path, by
  Determining whether the destination node of an IEEE 802 connection is a node inside or outside the mesh network;
  Generating an extended route reply message that includes one destination address of the destination node of the mesh path and a flag, which indicates that the extended route reply message covers the one destination address, if the destination node of the IEEE 802 connection is a node from inside the mesh network;
  Generating an extended route reply message that includes two destination addresses covering (a) the destination address of the destination node of the mesh path and (b) the destination address of the destination node of the IEEE 802 connection and the flag, which indicates that the extended route reply message covers the two destination addresses, if the destination node of an IEEE 802 connection is a node from outside the mesh network.

This method generates the extended route reply message depending on the location of the destination node of the IEEE 802 connection. Hence a transmission bandwidth=signaling overhead to transmit the extended route reply message is optimized depending on the location of the destination node of the IEEE 802 connection, because it covers only one destination address if the destination node of the IEEE 802 connection originates from a node inside the mesh network, otherwise two destination addresses. In addition the usage of the flag allows a faster transmission of the route reply message if a fixed bandwidth link is used for transmission, because it indicates whether only one or two destination addresses are transmitted, compared to the case that always two destination addresses have to be transmitted.

In an enhancement of this method, the destination node of the mesh path is assigned to a mesh node that reflects an egress node, mesh access point or mesh portal of the mesh network to address the destination node of the IEEE 802 connection, if the destination node of the IEEE 802 connection is a node from outside the mesh network.

This assignment supports a correct mapping of a destination address inside the mesh network if the destination node of the IEEE 802 connection originates from a node outside the mesh network. In addition this assignment allows that a frame finds its correct way to the node outside the mesh network through the mesh destination. Furthering this enhancement ensures a smooth handling of route request and route reply messages regardless whether the node is inside or outside the mesh network.

One of the previous methods can be enhanced by assigning a WLAN which complies with standard IEEE 802.11 to the mesh network. Hence the forgoing methods can be used if the WLAN is defined by the standard IEEE 802.11.

In an enhancement of the methods above a station which conforms to standard IEEE 802.11 and/or standard IEEE 802.3 may be the source or destination node of the IEEE 802 connection. By this enhancement also stations can be supported by the methods above that are implemented according to IEEE 802.11 and/or IEEE 802.3 standard.

Also described below is an extended route request message that is used for a route discovery for a route from a source node of an IEEE 802 connection to a destination node of an IEEE 802 connection including a mesh network path with a source node of the mesh path and a destination node of the mesh path, by
- one source address for the source node of the mesh path and a flag, which indicates that the extended route request message covers the one source address, if the source node of the IEEE 802 connection is a node located inside the mesh network;
- two source addresses covering (a) the source address of the source node of the mesh path and (b) the source address of the source node of the IEEE 802 connection and the flag, which indicates that the extended route request message covers the two source addresses, if the source node of an IEEE 802 connection is a node located outside the mesh network.

In an extension the extended route request message also assigns the source node of the mesh path to a mesh node that reflects an ingress node, mesh access point or mesh portal of the mesh network to address the source node of the IEEE 802 connection, if the source node of the IEEE 802 connection originates from a node outside the mesh network.

These extended route request messages show the same advantages as the respective methods that generate these messages.

Also described below is an extended route reply message for a route discovery for a route from a source node of an IEEE 802 connection to a destination node of an IEEE 802 connection including a mesh network path with a source node of the mesh path and a destination node of the mesh path, by
- one destination address for the destination node of the mesh path and a flag, which indicates that the extended route reply message covers the one destination address, if the destination node of the IEEE 802 connection is a node located inside the mesh network.
- two destination addresses covering (a) the destination address of the destination node of the mesh path and (b) the destination address of the destination node of the IEEE 802 connection and the flag, which indicates that the extended route reply message covers the two destination addresses, if the destination node of an IEEE 802 connection is a node located outside the mesh network.

An enhancement of the extended route reply message assigns the destination node of the mesh path to a mesh node that reflects an egress node, mesh access point or mesh portal of the mesh network to address the destination node of the IEEE 802 connection, if the destination node of the IEEE 802 connection is a node from outside the mesh network.

These extended route reply messages show the same advantages as the respective methods that generate these messages.

Also described below is a first node in a meshed network that generates an extended route reply message according to one of the previous methods and/or an extended route request message according to one of the previous methods.

Finally a second node in a meshed network is described below which evaluates an extended route reply message and/or an extended route request message, whereby these messages are setup as defined above. The second node can be capable of analyzing the extended route request message and to read one or two source addresses depending on a flag in the message and can be capable of analyzing the extended route reply message and to read one or two destination addresses depending on the flag of the message.

The methods discussed above can be implemented and executed by a MAP (MAP—Mesh Access Point) and/or MPP (MPP—Mesh Portal).

The first and/or second node(s) may use software, hardware or a combination of software and hardware, e.g. running on a microcontroller, to implement the methods discussed above.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 8 is a block diagram of a network topology for an illustrative example

DETAILED DESCRIPTION OF EXEMPLARY EMBODIMENT

Figure 1:
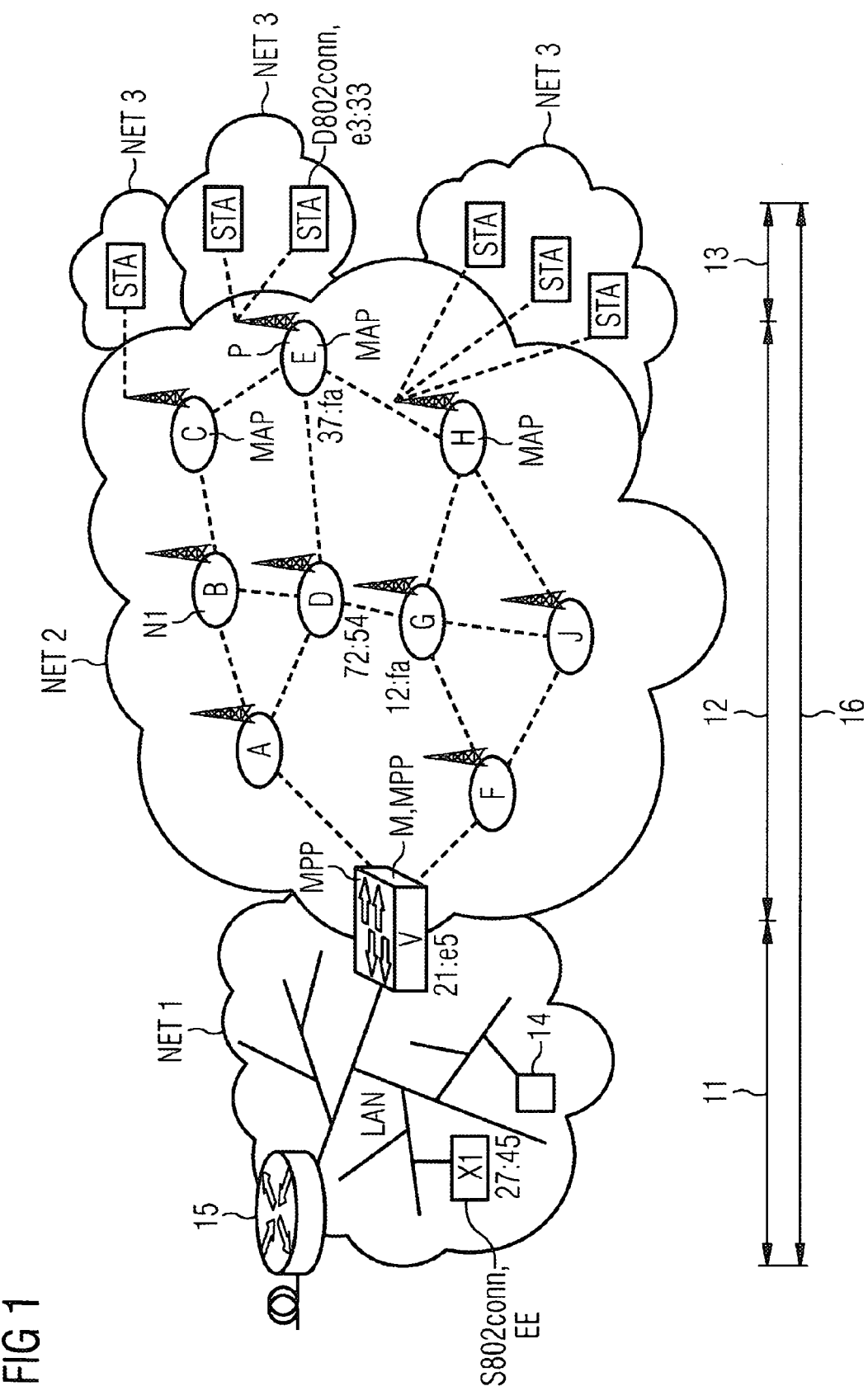
FIG. 1 is a block diagram of a network structure at layer 2 of IEEE 802.11 WLAN mesh networks.

Reference will now be made in detail to exemplary embodiments which are illustrated in the accompanying drawings, wherein like reference numerals refer to like elements throughout.

FIG. 1 is explained in the introduction. All 6 MAC addresses, as described in FIG. 1, can be different, a mesh data frame has to support 6 MAC addresses in some cases. A scheme for the use of 6 MAC addresses is known from Chu et. al., "Extension to 6-Address Scheme for TGs Mesh", 26 Jun. 2006, document number IEEE 802.11-06/841 r1, whereby there are MAC addresses 1 and 2 for the wireless link, MAC addresses 3 and 4 for the mesh path, and MAC addresses 5 and 6 for the 802 connection. MAC addresses 5 and 6 can be omitted if mesh path and 802 connections coincide. In this description the wording "802" describes any kind of node, a mesh node inside the mesh network, non-mesh nodes/non routable nodes, such as STA (STA—stations, see the June 2006 Draft amendment to standard IEEE 802.11™) and non- IEEE 802.11 nodes, e.g. IEEE 802.3 nodes. In addition the wording "device" and "node" is used in an equivalent way. A mesh path is a path inside the WLAN mesh network. An 802 connection is a path from an 802 node/device to an 802 node including path sections in and/or outside the mesh network.

The present route discovery process of HWMP (HWMP—Hybrid Wireless Mesh Protocol) according to the June 2006 Draft amendment to standard IEEE 802.11™ is enhanced such that the relationship between the mesh path and the 802 connection is maintained and correctly mapped to the available 6 addresses. The general idea is that the messages of the route discovery (route request and route reply messages) are extended with additional fields for MAC addresses in such a way that sources and destinations can be uniquely identified of both the 802 connection and the mesh path. The mapping between the sources and destinations of the 802 connection and the mesh path can be stored in lists or tables at the mesh nodes. It is sufficient to store this information in the mesh ingress and mesh egress nodes, e.g. at mesh nodes E and V of FIG. 1. Optionally, also intermediate mesh nodes may store this mapping information in their corresponding lists or tables. This will make some route discoveries unnecessary but requires maintenance of these entries. For instance, deassociations of stations STA from mesh access points have to be sent to all mesh nodes that have information about the mapping deassociated_STA-MAP in their lists or tables (MAP—Mesh Access Point). A mesh node MAP with an access point (AP—access point) is used to connect one or more STAs, see e.g. mesh node E in FIG. 1.

Each mesh node that can act as mesh ingress or mesh egress maintains two lists of mappings:
  the ingress list where the mesh destination address is determined for a given destination of the 802 connection
  the egress list where destinations of 802 connections are stored for which this mesh node can act as mesh destination node (mesh egress).

In general, the extended route discovery works the following way:

| | |
|---|---|
| S802conn | source node of 802 connection |
| D802conn | destination node of 802 connection |
| Smesh | source node of mesh path |
| Dmesh | destination node of mesh path |

A mesh node M receives a frame from node EE from outside the mesh, which has to be forwarded to D802conn. Since M can for-ward frames to the non-mesh node EE it adds the MAC-address of EE to its egress list. Assume that M does not have a valid path to D802conn nor that it can derive Dmesh for D802conn from the ingress list, so it has to initiate a route discovery for D802conn. It generates a route request message RREQ with 2 MAC source addresses—Smesh and S802conn. Mesh node M puts its own MAC address MAC(M) into the field for Smesh of the RREQ and takes the MAC value for the field for S802conn from the received frame.

The RREQ is broadcasted in the whole mesh network, so that mesh node N1 receives it. All mesh nodes that receive the RREQ may put the pair S802conn-Smesh into their ingress list.

Assume that mesh node N1 is D802conn (802 destination is in-side the mesh network). Mesh node N1 puts the pair S802conn-Smesh into its ingress list and generates a route reply message as usually defined in the June 2006 Draft amendment to standard IEEE 802.11™. The route reply message is sent to Smesh which is mesh node M.

Assume that D802conn is outside the mesh, and that mesh node P knows from its egress list that it can forward frames to D802conn. Mesh node P puts the pair S802conn-Smesh into its ingress list and generates a route reply message, where the originator/source address is Smesh and with 2 destination ad-dresses. One destination address is Dmesh, the other is D802conn. The route reply message is sent to Smesh which is mesh node M.

Finally, mesh node M receives a route reply for D802conn. If the route reply contains separate addresses for Dmesh and D802conn, M inserts the pair D802conn Dmesh into its ingress list. In this example Dmesh is P, because D802conn is outside the mesh network NET2.

The buffered packets for D802conn can now be forwarded on the newly created path to Dmesh.

For subsequent frames destined to D802conn assuming D802conn is outside the mesh, the mesh ingress M will find an entry for D802conn in its ingress list. This triggers the use of 6 addresses in the mesh data frame where
Smesh=M
Dmesh=P, derived from the entry in the ingress list
S802conn taken from the received frame
D802conn taken from the received frame.

Figure 2:
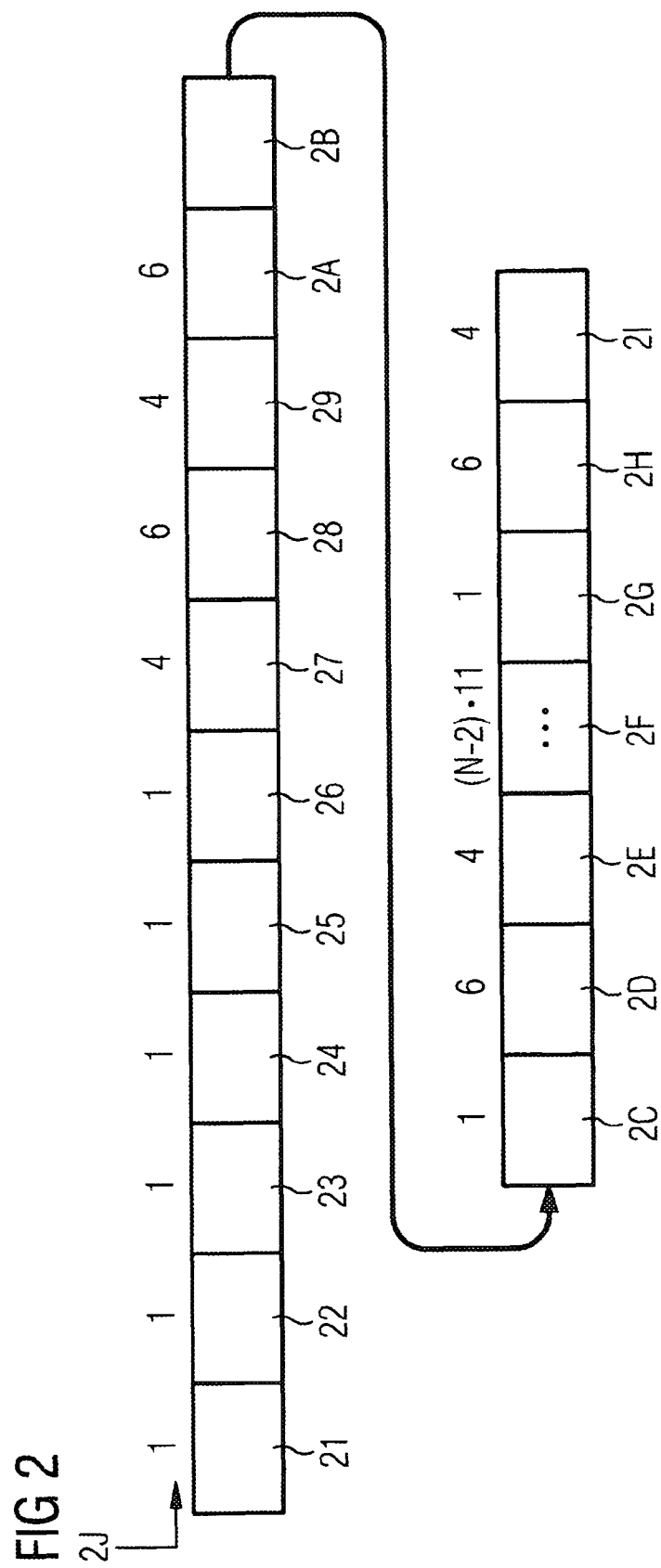
FIG. 2 is the message format of an extended route request message with both mesh source MAC address and 802 source MAC address.

In an extended route request message (eRREQ), the source MAC address is extended such to include the mesh source address and the source address of the 802 connection. There are two possibilities to do this:
  always use two MAC addresses, even if the source address of the 802 connection coincides with the mesh source ad-dress. A possible structure of a HWMP RREQ extended in this way is shown in FIG. 2.
  use a flag which indicates whether one source MAC address (source address of 802 connection and mesh source address coincide) or two source MAC addresses (source address of 802 connection and mesh source address are different) are used. A possible structure of a HWMP RREQ extended in this way is shown in FIG. 3.

Figure 3:
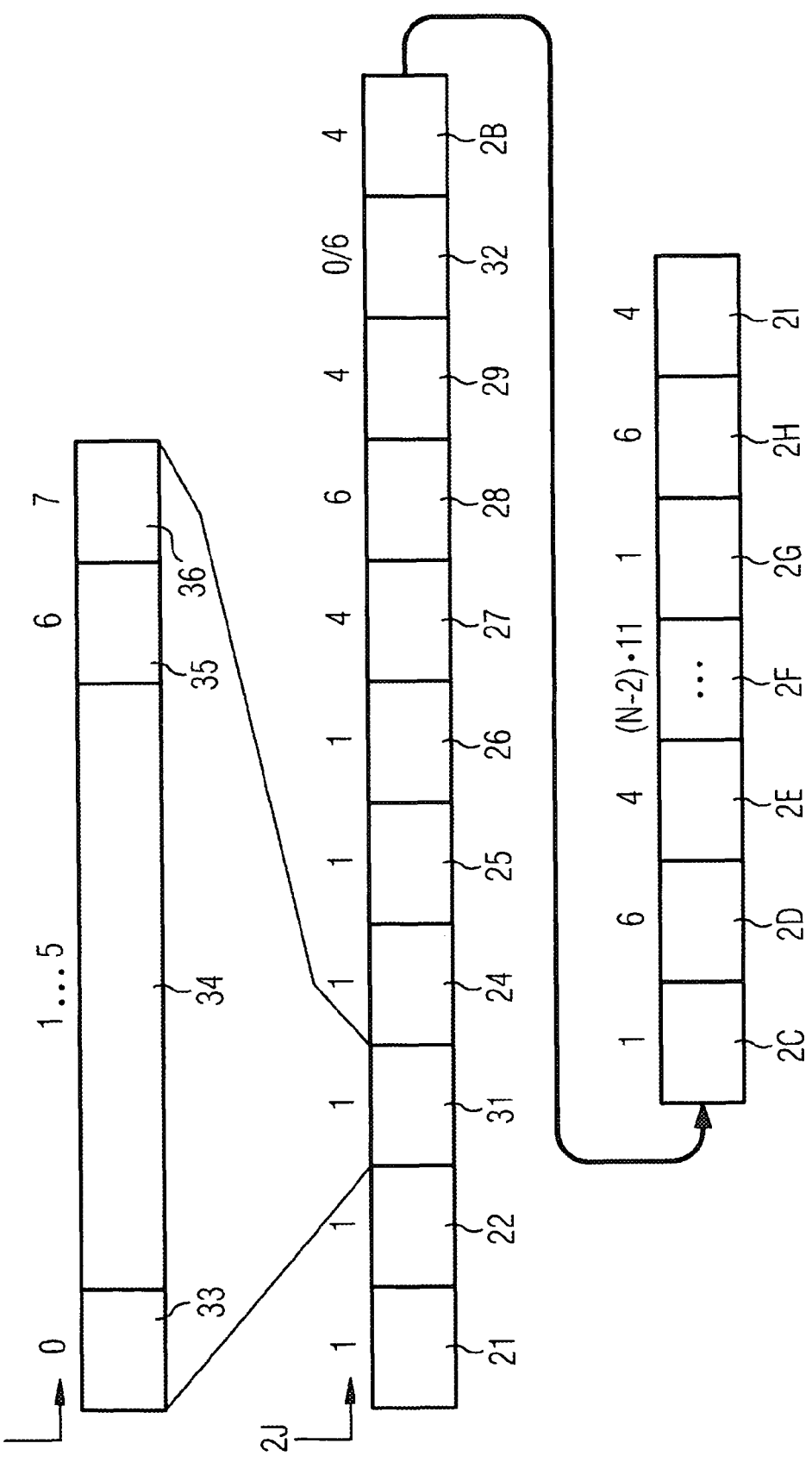
FIG. 3 is the message format of an extended route request message with flag-controlled source 802 MAC address.

The function of the fields of the eRREQ message in this example shown in FIGS. 2 and 3 are described by the following reference signs that are derived from the 802.11 documents cited previously.

"21" Element ID
"22" Length
"23" Flags
"24" TTL (Time-To-Live)
"25" Destination Count N
"26" Hop Count
"27" RREQ ID
"28" Mesh Source MAC Address
"29" Mesh Source Sequence Number
"2A" 802 Source MAC Address
"2B" Metric
"2C" Per 802 Destination Flag #1
"2D" 802 Destination MAC Address #1
"2E" Destination Sequence Number #1
"2F" Additional fields
"2G" Per 802 Destination Flags #N
"2H" 802 Destination MAC Address #N
"21" Destination Sequence Number #N
"2J" Octet(s)
"31" Flags
"32" 802 Source MAC Address
"33" Unicast/Broadcast
"34" reserved
"35" Separate 802 source MAC address
"36" reserved
"37" Bits The length of the 802 Source Mac Address 32 is derived from the sixth bit of the Flags field 31, which can be written as Flags.6, multiplied by 6 octets, hence Flags.6*6. In this example the sixth bit of Flags 31 is indicated by the sign reference 35. As the field "Separate 802 source MAC address" 35 can be 0 or 1, the length of the 802 Source Mac Address 32 is 0 octets or 6 octets.

Figure 4:
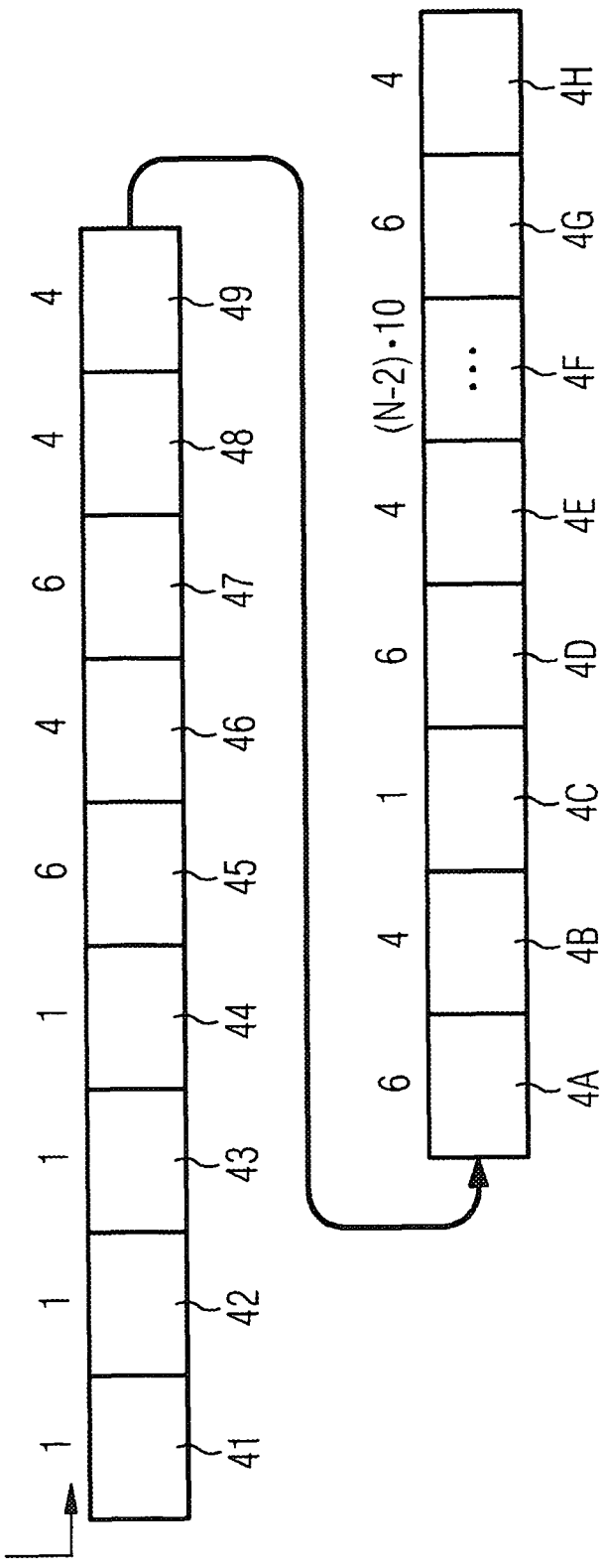
FIG. 4 is the message format of an extended route reply message with destination MAC address and 802 destination MAC address.

In an extended route reply message eRREP, the destination MAC address is extended such that it includes the destination MAC address of the 802 connection and the mesh destination MAC address. The destination MAC address of the 802 connection is the one for which the route discovery is done, the mesh destination MAC address is the address of the mesh egress which can forward frames to the destination of the 802 connection and therefore replies to the RREQ with a RREP. Again, there are two possibilities to do this:

- always use two MAC addresses, even if the destination address of the 802 connection coincides with the mesh destination address. A possible structure of a HWMP RREP extended in this way is shown in FIG. 4.
- use a flag which indicates whether one destination MAC address (destination address of 802 connection and mesh destination address coincide) or two destination MAC ad-dresses (destination address of 802 connection and mesh destination address are different) are used. A possible structure of a HWMP RREP extended in this way is shown in FIG. 5.

Figure 5:
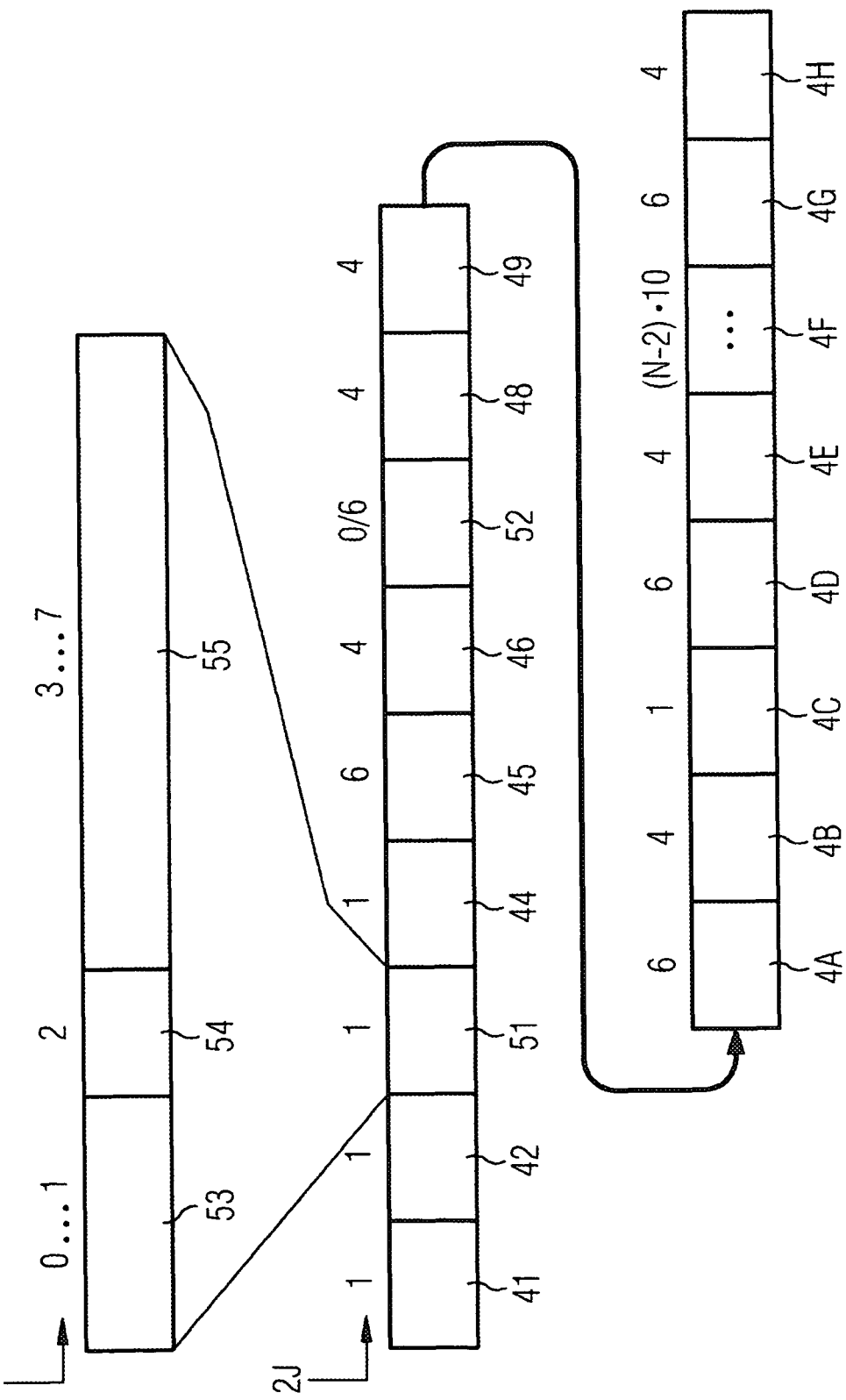
FIG. 5 is the message format of an extended route reply message with flag-controlled 802 destination MAC address.

The function of the fields of the eRREP message in this example shown in FIGS. 4 and 5 are described by the following reference signs that are derived from the 802.11 documents cited previously.

"41" Element ID
"42" Length
"43" Flags
"44" Hop Count
"45" Mesh Destination MAC Address
"46" Mesh Destination Sequence Number
"47" 802 Destination MAC Address
"48" Lifetime
"49" Metric
"4A" Mesh Source MAC Address
"4B" Mesh Source Sequence Number
"4C" Non-mesh STA count N
"4D" Non-mesh STA MAC address #1
"4E" Non-mesh STA Sequence Number
"4F" additional fields
"4G" Non-mesh STA MAC address #1
"4H" Non-mesh STA Sequence Number
"2J" Octet(s)
"51" Flags
"52" 802 Destination Mac Address
"53" reserved
"54" Separate 802 destination MAC address
"55" reserved
"37" Bits The length of the 802 Destination Mac Address 52 is derived from the second bit of the Flags field 51, which can be written as Flags.2, multiplied by 6 octets, hence Flags.2*6. In this example the second bit of Flags 51 is indicated by the sign reference 54. As the field "Separate 802 destination MAC address" 54 can be 0 or 1, the length of the 802 Destination Mac Address 52 is 0 octets or 6 octets.

It is sufficient, that only the mesh source address is used as originator MAC address in the RREP. Nevertheless, it is possible to give both the mesh source address as well as the source address of the 802 connection as addresses of the originator of this route request. Again, this can be done in two ways (always 2 addresses or flag for indication of 2 addresses).

Figure 6:
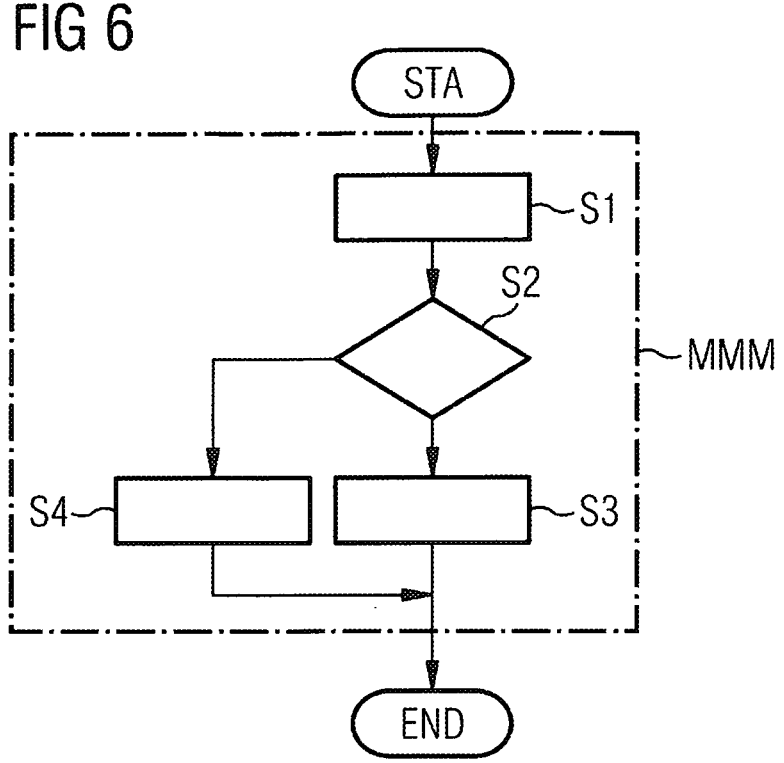
FIG. 6 is a flowchart diagram for generating an extended route request message.

FIG. 6 shows a flow chart of generating an eRREQ message depending on source MAC address of the source node S802conn of the 802 connection. This flow chart is started in step "STA". In a first step S1 the mesh node determines whether the source MAC address of the 802 connection is from a node inside or outside the mesh network. If the analysis shows, see step S2, that it originates inside the mesh network step S3 is executed. The eRREQ message is generated with one source MAC address that reflects the source address of the mesh node Smesh. In addition the flag, see FIG. 3 reference 35 "separate 802 source MAC address", is set such that it indicates that the generated eRREQ message only covers one source address, the mesh node source address, see reference 28 "Mesh Source MAC Address" in FIG. 3. In the other case, the step S4 is executed by using two source addresses in the eRREQ message, the source mesh node Smesh and the 802 source node of the IEEE 802 connection S802conn, see references 28 "Mesh Source Mac Address" and 32 "802 Source MAC Address" in FIG. 3. In addition the flag with the reference 35 "separate 802 source MAC address" in FIG. 3 is set such that it indicates that the generated RREQ message covers the two source addresses. Both steps S3 and S4 are terminated in step "END".

The determination step S1 can be executed by the mesh node by one of the following procedures:

(a) If the egress list covers the source MAC address of the source node S802conn then the source node is outside the mesh network. Otherwise the source node is expected to be inside the mesh network.

(b) If the MAC address of the mesh node is equal to the source MAC address of the source node S802conn then the source node is inside the mesh network. Otherwise the source node is outside the mesh network.

(c) If the mesh node received frames from the node S802conn through one of its non-mesh communication interfaces, then the source node S802conn is outside the mesh network.

Figure 7:
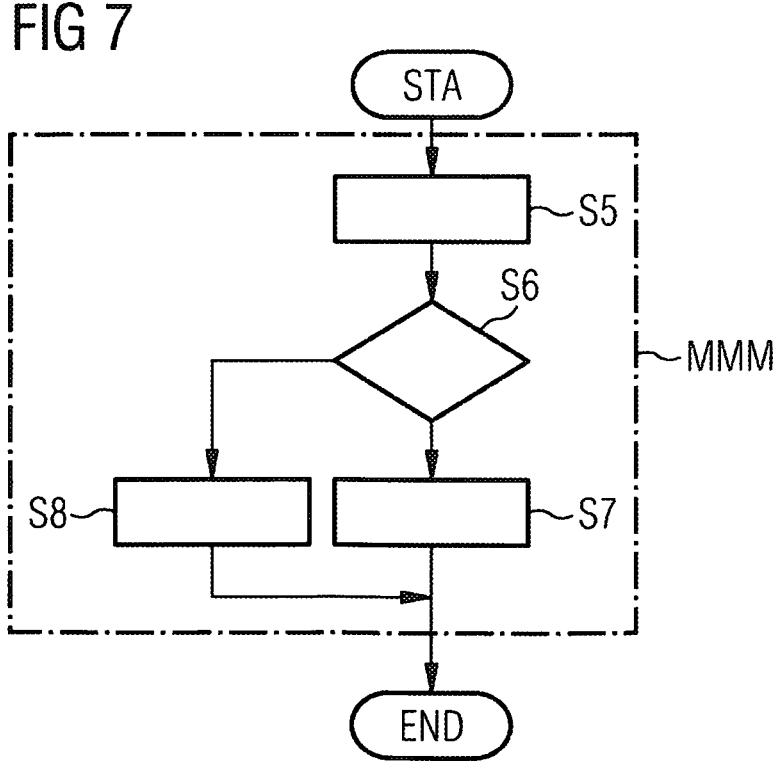
FIG. 7 is a flowchart diagram for generating an extended route reply message.

FIG. 7 shows a flow chart of generating an eRREP message depending on destination MAC address of the destination node D802conn of the 802 connection. This flow chart is started in step "STA". In a fifth step S5, the mesh node determines whether the destination MAC address of the 802 connection is from a node from inside or outside the mesh network. If the result of this termination, see step S6, is that the destination MAC address is from inside the mesh network step S7 is executed. The eRREP message is generated with one destination MAC address that reflects the destination address of the mesh node Dmesh. In addition the flag, see FIG. 5 reference 54 "separate 802 destination MAC address", is set such that it indicates that the generated eRREP message only covers one destination address, the mesh node destination address, see reference 45 "Mesh Destination MAC Address" in FIG. 5. In the other case, the step S8 is executed by using two destination addresses in the eRREP message, the mesh node Dmesh and the 802 destination address D802conn, see references 45 "Mesh Destination Mac Address" and 52 "802 Destination MAC Address" in FIG. 5. In addition, the flag with the reference 54 "separate 802 destination MAC address" in FIG. 5 is set such that it indicates that the generated eRREP message covers the two destination addresses. Both steps S7 and S8 are terminated in step "END".

The determination step S5 can be executed by the mesh node by one of the following procedures:

(a) If the egress list covers the destination MAC address of the destination node D802conn then the destination node is outside the mesh network. Otherwise the destination node is expected to be inside the mesh network.
(b) If the MAC address of the mesh node is equal to the destination MAC address of the destination node D802conn or the mesh node responds to a Route Request Message or an extended Route Request Message as an intermediate node for another mesh node then the destination node is inside the mesh network. Otherwise the destination node is outside the mesh network.
(c) If the mesh node received frames from the node D802conn through one of its non-mesh communication interfaces, then the destination node D802conn is outside the mesh network.

It has to be noted that the description of the RREP information element in the June 2006 Draft amendment to standard IEEE 802.11™ is faulty. There is some mixup with destinations and sources. In this description, we use a corrected version.

HWMP extended the RREP message. This addition is used in the pro-active extension of HWMP (tree-based routing) in registration mode. After the receipt of a root portal announcement, mesh points will register themselves with the root mesh portal by sending a route reply to the root mesh portal. Mesh access points will also include their associated non-mesh stations in this route reply message. The first destination MAC address (reference sign 45 in FIGS. 4 and 5) is the mesh access point and the subsequent non-mesh STA MAC addresses (reference signs 4D, 4F, 4G in FIGS. 4 and 5) are the non-mesh stations. Accordingly, the addresses of the non-mesh stations are destination addresses of a 802 connection. Therefore, the root mesh portal will put the corresponding number of pairs, covering MAP and non-mesh station, into its ingress list (non-mesh STA count N (reference sign 4C in FIG. 5) pairs).

Since the mesh points are inside the mesh network, the flag "separate 802 destination MAC address" (reference 54 in FIG. 5) is set such that only one destination address, "mesh destination MAC address" (reference 45 in FIG. 5), is contained in the route reply message. This destination address is the address of the mesh point that generates this route reply.

The methods described herein can be combined with the existing mechanism of the June 2006 Draft amendment to standard IEEE 802.11™. The mesh access points can act as mesh points on behalf of their associated non-mesh stations while the mesh portal works as described herein when dealing with packets from the wired LAN, such as IEEE 802.3 nodes/devices.

This closes a gap for the correct mapping between mesh paths and 802 connections in networks with IEEE 802.11s WLAN mesh networks. The extensions can be easily added to the existing specifications of the current draft standard. They fit into the philosophy of HWMP nicely.

The disclosure defines a general concept for dealing with different "routing domains" or subnetworks when no information about the network structure can be derived from the address-ing scheme. It can be also used in hierarchical routing architectures.

An example is described with respect to FIG. 8. There, MPP represents a mesh portal and MAP the mesh access point, whereby the MPP includes MMM to implement the method performed therein and the MAP includes NNN to implement the method performed therein.

Assumptions:
The ingress list of MPP is empty.
The egress list of MPP is empty.
The ingress list of MAP is empty.
The egress list of MAP contains {STA 1, STA 2}.
The routing table of MPP is empty.
The routing table of MAP is empty.

Assume that non-mesh node AX wants to send data frames to non-mesh station STA 2.

Process:
1. mesh portal MPP receives a data frame from AX with D802conn=STA 2 and S802conn=AX
2. MPP puts S802conn=AX into its egress list. The egress list of MPP contains {AX}.
3. MPP has no entry for D802conn=STA 2 in its ingress list.
4. MPP has no entry for D802conn=STA 2 in its routing table→MPP has to initiate route discovery for D802conn=STA 2.
5. MPP creates RREQ with
rreq.mesh_source_MAC_address=MPP;
rreq.802_source_MAC_address=AX;
rreq.802_destination_MAC_address=STA 2
6. MPP broadcasts RREQ
7. Intermediate mesh nodes B, E, C, F, D, G receive RREQ
8. Intermediate mesh nodes may put S802conn=AX-Smesh=MPP into their ingress list.
9. Intermediate mesh nodes create or update entry in rout-ing table for Smesh
10. Intermediate mesh nodes rebroadcast/forward updated RREQ
11. RREQ is received by MAP eventually→MAP has path to MPP
12. MAP has STA 2 in its egress list→MAP can reply with RREP
13. MAP puts S802conn=AX-Smesh=MPP into its ingress list. The ingress list of MAP contains {AX-MPP}.
14. MAP creates RREP for STA 2 with
rrep.mesh_destination_MAC_address=MAP;
rrep.802_destination_MAC_address=STA 2;
rrep.mesh_source_MAC_address=MPP;
15. MAP sends RREP to MPP on path to MPP.
16. MPP receives RREP from MPP→MPP has path to MAP
17. MPP puts D802conn=STA 2-Dmesh=MAP into its ingress list. The ingress list of MPP contains {STA 2-MAP}
18. The buffered data frame with D802conn=STA 2 and S802conn=AX is reprocessed
19. MPP finds the entry {STA 2-MAP} in its ingress list →can forward data frame as mesh data frame with 6 ad-dresses.
20. MPP converts data frame into mesh data frame with 6 ad-dresses with
address 3 Dmesh=MAP→taken from entry for D802conn=STA 2 from ingress list
address 4 Smesh=MPP→itself as mesh ingress node
address 5 D802conn=STA 2→taken from received data frame
address 6 S802conn=AX→taken from received data frame
21. mesh data frame is forwarded on path to MAP according to mesh forwarding rules
22. MAP receives mesh data frame
23. MAP sees that it is Dmesh→has to forward data frame to D802conn=STA 2
24. MAP finds D802conn=STA 2 in its egress list
25. MAP converts mesh data frame to frame format of interface to D802conn=STA 2
26. MAP forwards data frame to D802conn=STA 2

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

The embodiments can be implemented as an apparatus (a machine) that includes computing hardware (computing apparatus), such as (in a non-limiting example) any computer that can store, retrieve, process and/or output data and/or communicate (network) with other computers. Further, the described processes can be implemented by programming a computer to execute/process the processes and/or data structures described herein to provide a specific machine, namely to transform a general purpose machine into a specific purpose machine.

In particular, the processes when executed by the computer transform the mesh network, as a collection of articles, into a different state or thing, i.e., a network that provides a connection between two nodes that were not previously able to communicate.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for generating an extended route request message for route discovery of a route from a connection source node of an IEEE 802 connection to a connection destination node of an IEEE 802 connection including a mesh path in a mesh network with a mesh source node of the mesh path and a mesh destination node of the mesh path, comprising:
   determining whether the connection source node is inside or outside the mesh network;
   generating the extended route request message to include one source address of the mesh source node and a flag set to indicate that the extended route request message covers the one source address, if the connection source node is located inside the mesh network; and
   generating the extended route request message to include two source addresses covering (a) the source address of the mesh source node and (b) the source address of the connection source node and the flag set to indicate that the extended route request message covers the two source addresses, if the connection source node is located outside the mesh network, and
   wherein the flag is selectively set depending on a location of the connection source node relative to the mesh network affecting generation of the extended route request message.

2. A method according to claim 1, further comprising assigning the mesh source node to a mesh node that reflects an ingress node, mesh access point or mesh portal of the mesh network to address the connection source node, if the connection source node originates from a node outside the mesh network.

3. A method according to claim 2, further comprising assigning a WLAN conforming to an IEEE 802.11 standard to the mesh network.

4. A method according to claim 3, further comprising assigning to one of the connection source node and the connection destination node, a station conforming to at least one of an IEEE 802.11 standard and an IEEE 802.3 standard.

5. A method for generating an extended route reply message for route discovery of a route from a connection source node of an IEEE 802 connection to a connection destination node of the IEEE 802 connection including a mesh path in a mesh network with a mesh source node of the mesh path and a mesh destination node of the mesh path, comprising:
   determining whether the connection destination node is inside or outside the mesh network;
   generating the extended route reply message to include one destination address of the mesh destination node and a flag set to indicate that the extended route reply message covers the one destination address, if the connection destination node is inside the mesh network; and
   generating the extended route reply message to include two destination addresses covering (a) the destination address of the mesh destination node and (b) the destination address of the connection destination node and the flag set to indicate that the extended route reply message covers the two destination addresses, if the connection destination node is outside the mesh network, and
   wherein the flag is selectively set depending on a location of the connection destination node relative to the mesh network affecting generation of the extended route reply message.

6. A method according to claim 5, further comprising assigning the mesh destination node to a mesh node that reflects an egress node, mesh access point or mesh portal of the mesh network to address the connection destination node, if the connection destination node is outside the mesh network.

7. A method according to claim 6, further comprising assigning a WLAN conforming to an IEEE 802.11 standard to the mesh network.

8. A method according to claim 7, further comprising assigning to one of the connection source node and the connection destination node a station conforming to at least one of an IEEE 802.11 standard and an IEEE 802.3 standard.

9. A mesh source node comprising:
   a communication interface; and
   at least one processor to generate an extended route request message that is used for route discovery of a route from a connection source node of an IEEE 802 connection to a connection destination node of the IEEE 802 connection including a mesh path in a mesh network with the mesh source node of the mesh path and a mesh destination node of the mesh path,
   wherein the extended route request message comprises:
   one source address for the mesh source node and a flag set to indicate that the extended route request message covers the one source address, if the connection source node is located inside the mesh network; and
   two source addresses covering (a) the source address of the mesh source node and (b) the source address of the connection source node and the flag set to indicate that the extended route request message covers two source addresses, if the connection source node is located outside the mesh network, and
   wherein the flag is selectively set depending on a location of the connection source node relative to the mesh network affecting generation of the extended route request message.

10. A mesh source node according to claim 9, wherein the mesh source node is assigned to a mesh node that reflects an ingress node, mesh access point or mesh portal of the mesh network to address the connection source node, if the connection source node is located outside the mesh network.

11. A mesh destination node comprising:
a communication interface; and
at least one processor to produce an extended route reply message for route discovery for a route from a connection source node of an IEEE 802 connection to a connection destination node of an IEEE 802 connection including a mesh path in a mesh network with a mesh source node of the mesh path and the mesh destination node of the mesh path,
wherein the extended route reply message comprises:
one destination address for the mesh destination node and a flag set to indicate that the extended route reply message covers the one destination address, if the connection destination node is located inside the mesh network; and
two destination addresses covering (a) the destination address of the mesh destination node and (b) the destination address of the connection destination node and the flag set to indicate that the extended route reply message covers the two destination addresses, if the connection destination node is located outside the mesh network, and
wherein the flag is selectively set depending on a location of the connection destination node relative to the mesh network affecting generation of the extended route reply message.

12. A mesh destination node according to claim 11, further comprising assigning the mesh destination node to a mesh node that reflects an egress node, mesh access point or mesh portal of the mesh network to address the connection destination node, if the connection destination node is located outside the mesh network.

13. A node in a mesh network, comprising:
a communication interface; and
at least one processor to execute:
generating at least one of an extended route request message and an extended
route reply message for route discovery of a route from a connection source node of an IEEE 802 connection to a connection destination node of an IEEE 802 connection including a mesh path in the mesh network with a mesh source node of the mesh path and a mesh destination node of the mesh path, the generating of the extended route request message including determining whether the connection source node is inside or outside the mesh network;
generating the extended route request message to include one source address of the mesh source node and a request message flag set to indicate that the extended route request message covers the one source address, if the connection source node is located inside the mesh network; and
generating the extended route request message to include two source addresses covering (a) the source address of the mesh source node and (b) the source address of the connection source node and the request message flag set to indicate that the extended route request message covers the two source addresses, if the connection source node is located outside the mesh network, and
the generating of the extended route reply message including determining whether the connection destination node is inside or outside the mesh network;
generating the extended route reply message to include one destination address of the mesh destination node and a reply message flag set to indicate that the extended route reply message covers the one destination address, if the connection destination node is inside the mesh network; and
generating the extended route reply message to include two destination addresses covering (a) the destination address of the mesh destination node and (b) the destination address of the connection destination node and the reply message flag set to indicate that the extended route reply message covers the two destination addresses, if the connection destination node is outside the mesh network, and
wherein the request message flag and the reply message flag are selectively set depending on a location of at least one of the connection source node and the connection destination node relative to the mesh network affecting generation of the extended route request message and extended route reply message, respectively.

14. A node in a mesh network, comprising:
a communication interface; and
at least one processor to execute:
evaluating at least one of an extended route request message and an extended route reply message used for discovery of a route from a connection source node of an IEEE 802 connection to a connection destination node of the IEEE 802 connection including a mesh path in the mesh network with a mesh source node of the mesh path and a mesh destination node of the mesh path, the extended route request message including one source address for the mesh source node and a request message flag set to indicate that the extended route request message covers the one source address, if the connection source node is located inside the mesh network; and
two source addresses covering (a) the source address of the mesh source node and (b) the source address of the connection source node and the request message flag set to indicate that the extended route request message covers the two source addresses, if the connection source node is located outside the mesh network, and
the extended route reply message including one destination address for the mesh destination node and a reply message flag set to indicate that the extended route reply message covers the one destination address, if the connection destination node is located inside the mesh network; and
two destination addresses covering (a) the destination address of the mesh destination node and (b) the destination address of the connection destination node and the reply message flag set to indicate that the extended route reply message covers the two destination addresses, if the connection destination node is located outside the mesh network, and
wherein the request message flag and the reply message flag are selectively set depending on a location of at least one of the connection source node and the connection destination node relative to the mesh network affecting generation of the extended route request message and extended route reply message, respectively.

15. A non-transitory computer-readable medium which when executed on a processor causes the processor to execute a process comprising:
generating an extended route request message that is used for discovery of a route from a connection source node of an IEEE 802 connection to a connection destination node of the IEEE 802 connection including a mesh path in a mesh network with a mesh source node of the mesh path and a mesh destination node of the mesh path;

providing the generated extended route message one source address for the mesh source node and a flag set to indicate that the extended route request message covers the one source address, when the connection source node is located inside the mesh network; and providing the generated extended route message two source addresses covering the source address of the mesh source node and the source address of the connection source node and the flag set to indicate that the extended route request message covers two source addresses, when the connection source node is located outside the mesh network, and wherein the flag is selectively set depending on a location of the connection source node relative to the mesh network affecting generation of the extended route request message.

16. The non-transitory computer-readable medium according to claim 15, wherein the process executed by the processor comprising:

assigning the mesh source node to a mesh node that reflects an ingress node, mesh access point or mesh portal of the mesh network to address the connection source node, when the connection source node is located outside the mesh network.

17. A method comprising:

generating an extended route request message that is used for discovery of a route from a connection source node of an IEEE 802 connection to a connection destination node of the IEEE 802 connection including a mesh path in a mesh network with a mesh source node of the mesh path and a mesh destination node of the mesh path;

providing the generated extended route message one source address for the mesh source node and a flag set to indicate that the extended route request message covers the one source address, when the connection source node is located inside the mesh network; and providing the generated extended route message two source addresses covering the source address of the mesh source node and the source address of the connection source node and the flag set to indicate that the extended route request message covers two source addresses, when the connection source node is located outside the mesh network, and wherein the flag is selectively set depending on a location of the connection source node relative to the mesh network affecting generation of the extended route request message.

18. The method according to claim 17, comprising:

assigning the mesh source node to a mesh node that reflects an ingress node, mesh access point or mesh portal of the mesh network to address the connection source node, when the connection source node is located outside the mesh network.

* * * * *